(12) United States Patent
Peng et al.

(10) Patent No.: US 8,296,444 B2
(45) Date of Patent: Oct. 23, 2012

(54) MEDIUM RESOURCE RESERVATION METHOD, SERVICE PACKAGE INFORMATION OBTAINING METHOD AND APPARATUS

(75) Inventors: Zhaojun Peng, Shenzhen (CN); Feng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

(21) Appl. No.: 12/767,361

(22) Filed: Apr. 26, 2010

(65) Prior Publication Data

US 2010/0205290 A1    Aug. 12, 2010

Related U.S. Application Data

(63) Continuation of application No. PCT/CN2008/073170, filed on Nov. 24, 2008.

(30) Foreign Application Priority Data

Nov. 27, 2007  (CN) .......................... 2007 1 0195461

(51) Int. Cl.
*G06F 15/16* (2006.01)
*G06F 12/00* (2006.01)
(52) U.S. Cl. ........................................ 709/227; 709/206
(58) Field of Classification Search .......... 709/227–229, 709/230, 250
See application file for complete search history.

(56) References Cited

U.S. PATENT DOCUMENTS

| 6,201,971 | B1 | 3/2001 | Purnadi et al. | |
|---|---|---|---|---|
| 6,904,035 | B2 * | 6/2005 | Requena | 370/338 |
| 7,102,640 | B1 * | 9/2006 | Aholainen et al. | 345/440 |
| 7,468,983 | B2 * | 12/2008 | Requena et al. | 370/401 |
| 7,647,408 | B2 * | 1/2010 | O'Neill | 709/227 |
| 2003/0115332 | A1 * | 6/2003 | Honeisen | 709/227 |
| 2003/0149775 | A1 * | 8/2003 | O'Neill | 709/227 |
| 2003/0236912 | A1 | 12/2003 | Klemets et al. | |
| 2004/0057412 | A1 * | 3/2004 | Curcio et al. | 370/341 |
| 2004/0085949 | A1 * | 5/2004 | Partanen et al. | 370/352 |
| 2004/0139088 | A1 | 7/2004 | Mandato et al. | |
| 2004/0196867 | A1 * | 10/2004 | Ejzak et al. | 370/468 |

(Continued)

FOREIGN PATENT DOCUMENTS

CN        1511406 A       7/2004

(Continued)

OTHER PUBLICATIONS

ETSI TS 183 063 V0.0.7; ETSI Standard; Telecommunications and Internet Converged Services and Protocols for Advanced Networking (TISPAN); IMS based IPTV Stage 3 Specification, Dec. 2007, 111 pgs.

(Continued)

*Primary Examiner* — Zarni Maung
(74) *Attorney, Agent, or Firm* — Finnegan, Henderson, Farabow, Garrett & Dunner LLP

(57) ABSTRACT

A medium resource reservation method, a service package information obtaining method, and a service package information obtaining apparatus are provided, which are capable of decreasing resource waste of medium resource reservation. The resource reservation method includes the following steps. A service message carrying Session Description Protocol (SDP) information is received, and the SDP information contains service package information. The service package information is parsed from the SDP information. The service package information is employed for resource reservation. The method can identify the service package, so that the service package processing efficiency is improved, and the resource waste of medium resource reservation is effectively decreased.

4 Claims, 5 Drawing Sheets

U.S. PATENT DOCUMENTS

| | | |
|---|---|---|
| 2005/0055728 A1 | 3/2005 | Gardes et al. |
| 2005/0210141 A1* | 9/2005 | Oyama et al. ............... 709/228 |
| 2007/0047590 A1* | 3/2007 | Curcio et al. ............... 370/503 |
| 2007/0083659 A1 | 4/2007 | Ji et al. |
| 2007/0168534 A1 | 7/2007 | Hiltunen et al. |
| 2007/0211683 A1 | 9/2007 | Shaheen et al. |
| 2008/0151885 A1* | 6/2008 | Horn et al. ............... 370/389 |
| 2008/0307108 A1 | 12/2008 | Yan et al. |
| 2009/0094376 A1* | 4/2009 | Kosiba ............... 709/231 |
| 2009/0144429 A1 | 6/2009 | Astrom |

FOREIGN PATENT DOCUMENTS

| | | |
|---|---|---|
| CN | 1886987 A | 12/2006 |
| CN | 1968258 A | 5/2007 |
| JP | 2002141954 A | 5/2002 |
| JP | 2004529584 A | 9/2004 |
| JP | 2005513966 A | 5/2005 |
| JP | 2008-543133 | 11/2008 |
| JP | 2009527154 A | 7/2009 |
| WO | WO2006075588 A1 | 7/2006 |
| WO | WO 2007/056939 A1 | 5/2007 |

OTHER PUBLICATIONS

International Search Report from P.R. China in International Application No. PCT/CN2008/073170 mailed Mar. 5, 2009.

First Japanese Office Action dated (mailed) Aug. 23, 2011, issued in related Japanese Application No. 2010-534353 Huawei Technologies Co., LTD.

Written Opinion of the International Searching Authority (translation) dated (mailed) Mar. 5, 2009, issued in related Application No. PCT/CN2008/073170, filed Nov. 24, 2008, Huawei Technologies Co., Ltd.

* cited by examiner

US 8,296,444 B2

MEDIUM RESOURCE RESERVATION METHOD, SERVICE PACKAGE INFORMATION OBTAINING METHOD AND APPARATUS

CROSS-REFERENCE TO RELATED APPLICATIONS

This application is a continuation of International Application No. PCT/CN2008/073170, filed on Nov. 24, 2008, which claims priority to Chinese Patent Application No. 200710195461.9, filed on Nov. 27, 2007, both of which are hereby incorporated by reference in their entireties.

FIELD OF THE TECHNOLOGY

The present invention relates to the field of communication technology, and more particularly to a medium resource reservation method, a service package information obtaining method, and a service package information obtaining apparatus.

BACKGROUND OF THE INVENTION

With the development of IP multimedia subsystem (IMS), various IMS-based services continuously emerge, for example, IMS-based Internet Protocol television (IPTV) provides IPTV services under the integral architecture of IMS.

IPTV streaming media service is a new service developed rapidly in recent years. The streaming media service transmits multimedia files such as contents of video or audio files over a packet-switched network by a streaming transmission technology. These contents can be accessed and played immediately without being completely downloaded. The critical technology for realizing the streaming media is the streaming transmission technology, which can process and store uninterrupted video and audio information in a web server, so that a user can watch and listen to the programs while downloading, and need not wait till the entire file has been downloaded.

A typical example of multicast service is live broadcast (BC) TV service. Since all users enjoying the same program receive identical program content at each moment, the network bandwidth requirement may be decreased by bearer layer multicast.

In the IMS-based data service, the medium resource reservation method in the prior art is described as follows.

UE sends a service message associated with a service package to a server. One service package contains one or more services, one service contains multiple media components (audio, video, and the like), and a Session Description Protocol (SDP) carried in the service message contains media description information about one or more service packages.

However, in the above technology, since the SDP only contains media description information, but does not contain service package identifier information about the media, the server in service processing needs to reserve resources for the total resources of all the media, resulting in serious resource waste.

SUMMARY OF THE INVENTION

Accordingly, the present invention is mainly directed to a medium resource reservation method, a service package information obtaining method, and a service package information obtaining apparatus, which are capable of identifying a service package, thereby enhancing the service package processing efficiency.

In an embodiment of the present invention, a medium resource reservation method is provided, which includes the following steps.

A service message carrying Session Description Protocol (SDP) information is received, and the SDP information contains service package information. The service package information is parsed from the SDP information.

The service package information is for resource reservation.

In an embodiment of the present invention, a service package information obtaining method is provided, which includes the following steps.

SDP information in a received service message is parsed to obtain a group attribute line.

A semantic component of the group attribute line is parsed to obtain a service package identifier, and an identification-tag component of the group attribute line is parsed to obtain a channel identifier.

In an embodiment of the present invention, a service package information obtaining method is provided, which includes the following steps.

SDP information in a received service message is parsed to obtain an attribute line.

An attribute component of the attribute line is parsed to obtain a service package attribute, and an attribute value component of the attribute line is parsed to obtain a service package and a channel identifier.

In an embodiment of the present invention, a service package information obtaining method is provided, which includes the following steps.

SDP information in a received service message is parsed to obtain an attribute line.

An attribute component of the attribute line is parsed to obtain a default service package attribute.

In an embodiment of the present invention, a service package information obtaining apparatus is provided, which includes a service message receiving unit, an SDP parsing unit, and a group attribute line parsing unit.

The service message receiving unit is configured to receive a service message carrying SDP information about a service package identifier.

The SDP parsing unit is configured to parse the received SDP information to obtain a group attribute line.

The group attribute line parsing unit is configured to parse a semantic component of the group attribute line to obtain a service package identifier, and parse an identification-tag component of the group attribute line to obtain a channel identifier.

In an embodiment of the present invention, a service package information obtaining apparatus is provided, which includes a service message receiving unit, an SDP parsing unit, and a parsing unit.

The service message receiving unit is configured to receive a service message carrying SDP information about a service package identifier.

The SDP parsing unit is configured to parse the received SDP information to obtain an attribute line.

The parsing unit is configured to parse an attribute component of the attribute line to obtain a default service package attribute.

In the technical solutions provided in the embodiments of the present invention, since the SDP information carried in the service message contains the service package information and the service package information can be extracted from the SDP information of the received service message, the service package required by the currently processed service can be learned. Thus, media processing may be performed on the required service package, for example, medium resource reservation may be performed for the media components required by the service, instead of the total resources, thereby decreasing resource waste of medium resource reservation.

DETAILED DESCRIPTION OF THE EMBODIMENTS

The embodiments of the present invention provide a medium resource reservation method, a service package information obtaining method, and a service package information obtaining apparatus, which are capable of identifying a service package, thereby enhancing the service package processing efficiency.

In the technical solutions provided in the embodiments of the present invention, since the service package information can be extracted from the SDP information of the received service message, the service package required by the currently processed service can be learned. Thus, media processing may be performed on the required service package, for example, medium resource reservation may be performed for the media components required by the service, instead of the total resources, thereby decreasing resource waste of medium resource reservation.

Figure 1:
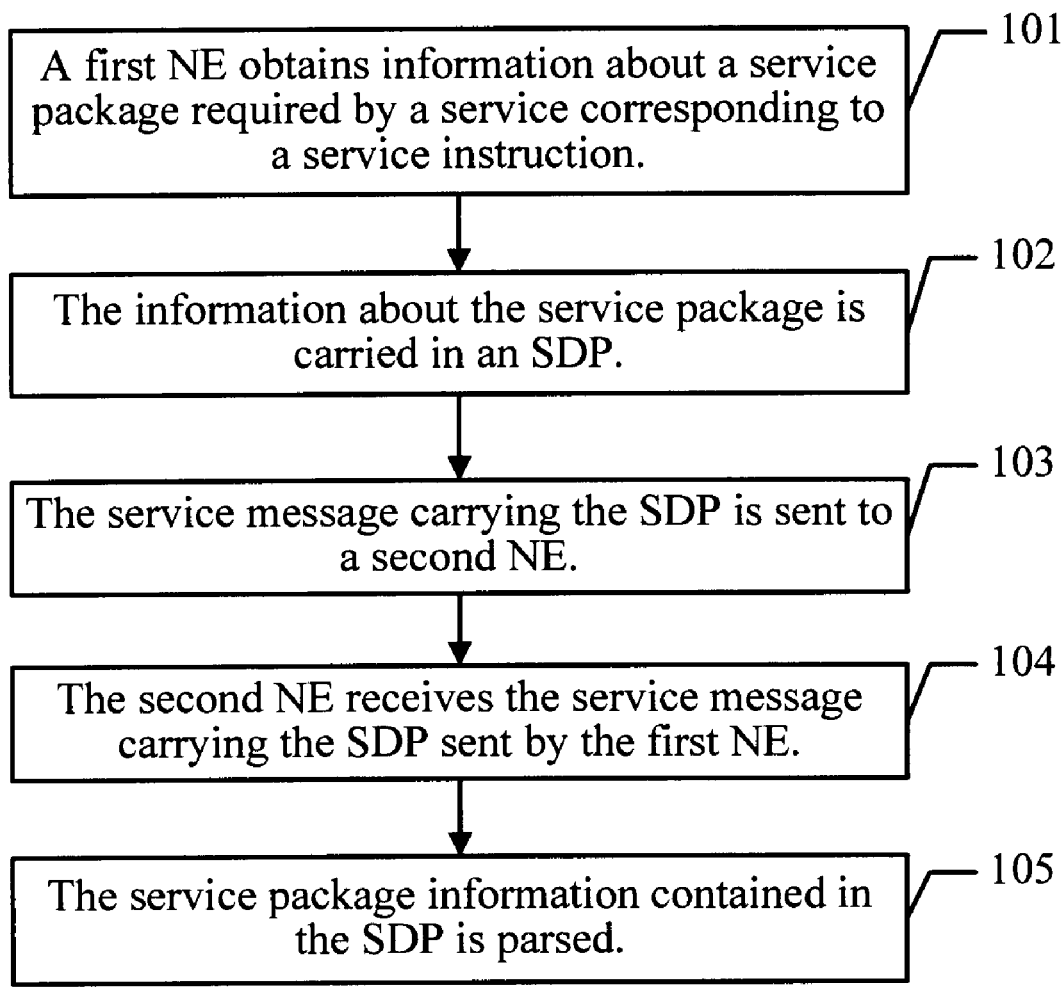
FIG. 1 is a flow chart of a service package information obtaining method according to an embodiment of the present invention.

Firstly, in an embodiment of the present invention, a service package information obtaining method is described as follows. It should be noted that, in this embodiment and all the subsequent embodiments, a service package is obtained from an SDP. Referring to FIG. 1, the embodiment of the service package information obtaining method includes the following steps.

In step 101, a first network element (NE) obtains information about a service package required by a service corresponding to a service instruction.

In this embodiment, after obtaining the service instruction, the first NE obtains the information about the service package required by the service corresponding to the service instruction.

In step 102, the information about the service package is carried in an SDP.

Specifically, an attribute line is set in the SDP for carrying the information about the service package in the SDP. If a channel identifier is included, the channel identifier and the service package identifier may be set in the same attribute line, that is, the service package is identified in the SDP.

The specific identifying method is described in detail below.

1. Process for Identifying the Information about the Service Package

In this embodiment, the identification of the information about the service package can be implemented in various manners. It is understandable that, in actual applications, different parameter names or data formats can be adopted depending on specific conditions.

Specifically, the service package can be identified in the following manners.

In Manner 1, an attribute line is set for identifying the information about the service package.

The attribute line "a=<attribute>:<value>" is set in the contents included in the SDP.

The attribute in the attribute component is used for identifying the attribute of an IPTV BC service package, and may be a character set or the like. The value in the attribute value component is used for identifying the service package identifier, for example, the name or serial number of the service package, and may be a number, a uniform resource identifier (URI), a uniform resource locator (URL), a character set, a token, or other types of identifiers.

For ease of illustration, a specific example is provided in the following.

A statement a=BC_Service_Package:1 indicates that the attribute is IPTV BC service package 1.

A set line "a=" may be a session-level attribute or a media-level attribute.

The line "a=<attribute>:<value>" placed behind a media line "m=" is a media-level attribute, indicating that the medium belongs to the service package with the value.

The line "a=<attribute>:<value>" placed before a first media line "m=" is a session-level attribute, indicating that all the media without the media-level service package attribute line belong to the service package with the value.

In the following example, the line "a=" is placed behind each line "m=" for indicating the media-level attribute.

m=audio 49170 RTP/AVP 0
a=BC_Service_Package:1 (Service package 1)
m=video 49172 RTP/AVP 99
a=BC_Service_Package:1 (Service package 1)
m=audio 39170 RTP/AVP 0
a=BC_Service_Package:2 (Service package 2)

The information indicates that, the first medium "audio" and the second medium "video" both belong to Service package 1, and the third medium "audio" belongs to Service package 2.

In the following example, the line "a=" is placed before the first line "m=" for indicating the session-level attribute.

a=BC_Service_Package:1 (Service package 1)
m=audio 49170 RTP/AVP 0
m=video 49172 RTP/AVP 99 m=audio 39170 RTP/AVP 0
a=BC_Service_Package:2 (Service package 2)

In this example, the line "a=" placed before the first line "m=" indicates that, the first medium "audio" and the second medium "video" belong to Service package 1, and the third medium "audio" belongs to Service package 2.

In Manner 2, the attribute line and the media line are set to both identify the service package.

Specifically, the line "a=" added before the first media line "m=" is set as "a=<attribute>:<value>" for describing the service package attribute line, and different service packages are identified with different values.

The attribute in the attribute component is used for identifying the attribute of an IPTV BC service package, and may be a character set or the like. The value in the attribute value component is used for identifying the service package identifier, for example, the name or serial number of the service package, and may be a number, a URI, a URL, a character set, a token, or the like.

Meanwhile, "a=label:<label pointer>" is added behind each line "m=". The value of the label pointer is selected from the value that identifies the service package, and used for identifying the service package that the line "m=" belongs to. The media corresponding to the lines "m=" having the same label pointer belong to the same service package, and the information about the service package is identified by the value. For example:

a=BC_Service_Package:1 (indicating that the attribute is Service package 1)
a=BC_Service_Package:2 (indicating that the attribute is Service package 2)
   m=audio 49170 RTP/AVP 0
   a=label:1
   m=video 49172 RTP/AVP 99
   a=label:1
   m=audio 39170 RTP/AVP 0
   a=label:2

The line "a=" added before the first line "m=" and the attribute of the label behind each line "m=" indicate that, the first medium "audio" and the second medium "video" both belong to Service package 1, and the third medium "audio" belongs to Service package 2.

When one SDP includes several service packages, it may be considered to group media lines belonging to different service packages so as to identify the service packages. Specifically, the following manner can be adopted.

In Manner 3, a group attribute line "a=group:" is adopted to associate multiple media lines "m=" to constitute a service package, so as to identify the service package.

The adopted attribute line "a=group:" may be: group-attribute="a=group:" semantics *(space identification-tag).

The semantics is used for identifying an attribute of an IPTV BC service package, and may be a character set or the like. The identification-tag is used for identifying different media streams, and may be a number, a token, or the like.

For example, "a=group:BC_Service_Package 1 2 3" indicates that the media corresponding to media stream identifiers 1, 2, 3 belong to the same service package.

Alternatively, the adopted attribute line "a=group:" may be: group-attribute="a=group:" semantics *(space identification-tag).

The semantics is used for identifying an identifier of an IPTV BC service package, and may be a character set or the like. The identification-tag is used for identifying different media streams, and may be a number, a token, or the like.

For example, "a=group:BC_Service_Package1 1 2 3" indicates that the media corresponding to media stream identifiers 1, 2, 3 belong to the service package with the service package identifier of BC_Service_Package1.

Thereby, that the first three lines "m=" belong to the same service package and the last two lines "m=" belong to the same service package may be expressed below with the attribute line "a=group:", respectively.

a=group:BC_Service_Package 1 2 3 (indicating that the media corresponding to the media stream identifiers 1, 2, 3 belong to the same service package), or
a=group:BC_Service_Package1 1 2 3 (indicating that the media corresponding to the media stream identifiers 1, 2, 3 belong to the service package with the service package identifier of BC_Service_Package1); and
a=group:BC_Service_Package 4 5 (indicating that the media corresponding to the media stream identifiers 4, 5 belong to the same service package), or
a=group:BC_Service_Package2 4 5 (indicating that the media corresponding to the media stream identifiers 4, 5 belong to the service package with the service package identifier of BC_Service_Package2).

m=audio 49170 RTP/AVP 0
   a=mid:1
   m=video 49172 RTP/AVP 99
   a=mid:2
   m=text 49174 UDP wb
   a=mid:3
   m=audio 39170 RTP/AVP 0
   a=mid:4
   m=video 39172 RTP/AVP 99
   a=mid:5

The situation that media streams are identified by identification-tag is described above. Another situation is introduced as follows.

Likewise, the adopted attribute line "a=group:" may be: group-attribute="a=group:" semantics *(space identification-tag).

The semantics is used for identifying the attribute of the IPTV BC service package, and may be a character set or the like. The identification-tag is used for indicating a channel identifier, and may be a number, a URI, a URL, a character set, a token, or the like.

For example, "a=group:BC_Service_Package 1 2 3" indicates that the media corresponding to Channel identifiers 1, 2, 3 belong to the same service package.

Alternatively, the adopted attribute line "a=group:" may be: group-attribute="a=group:" semantics *(space identification-tag).

The semantics is used for identifying the identifier of the IPTV BC service package, and may be a character set or the like. The identification-tag is used for indicating different channel identifiers, and may be a number, a URI, a URL, a character set, a token, or the like.

For example, "a=group:BC_Service_Package1 1 2 3" indicates that the media corresponding to Channel identifiers 1, 2, 3 belong to the service package with the service package identifier of BC_Service_Package1.

Thereby, that the first three lines "m=" belong to the same service package and the last two lines "m=" belong to the same service package may be expressed below with the attribute line "a=group:", respectively.

a=group:BC_Service_Package 1 2 3 (indicating that the media corresponding to Channel identifiers 1, 2, 3 belong to the same service package), or
a=group:BC_Service_Package1 1 2 3 (indicating that the media corresponding to Channel identifiers 1, 2, 3 belong to the service package with the service package identifier of BC_Service_Package1); and a=group:BC_Service_Package 4 5 (indicating that the media corresponding to Channel identifiers 4, 5 belong to the same service package), or a=group:BC_Service_Package2 4 5 (indicating that the media corresponding to Channel identifiers 4, 5 belong to the service package with the service package identifier of BC_Service_Package2).

m=audio 49170 RTP/AVP 0
a=BC_Channel:1 (Channel 1)
m=video 49172 RTP/AVP 99
a=BC_Channel:2 (Channel 2)
m=text 49174 UDP wb
a=BC_Channel:3 (Channel 3)
m=audio 39170 RTP/AVP 0
a=BC_Channel:4 (Channel 4)
m=video 39172 RTP/AVP 99
a=BC_Channel:5 (Channel 5)

In Manner 4, an attribute line is set, and a service package and a channel are identified.

Specifically, the line "a=" may be set as: a=<attribute>:<value>.

The attribute in the attribute component is used for identifying a composite attribute of the IPTV BC service package and the channel, and may be a character set or the like.

The value in the attribute value component is used for identifying a composite identifier of the service package and the channel, such as a composite name or a composite serial number of the service package and the channel, and may be a number, a URI, a URL, a character set, a token, or the like.

For example, a statement a=BCServicePackage_channel:1_1 indicates that the attribute is Channel 1 in IPTV BC service package 1.

A set line "a=" may be a session-level attribute or a media-level attribute.

The line "a=<attribute>:<value>" placed before the first media line "m=" is a session-level attribute, indicating that all the media without a composite attribute line of the media-level service package and the channel belong to the service package and the channel with the value.

The line "a=<attribute>:<value>" placed behind the line "m=" is the media-level attribute, indicating that the line "m=" belongs to the service package and the channel corresponding to the value.

In the following example, the line "a=" is placed behind the line "m=" for indicating the media-level attribute.

m=audio 49170 RTP/AVP 0
a=BCServicePackage_channel:1_1 (Channel 1 in Service package 1)
m=video 49172 RTP/AVP 99
a=BCServicePackage_channel:1_2 (Channel 2 in Service package 1)
m=audio 39170 RTP/AVP 0
a=BCServicePackage_channel:2_1 (Channel 1 in Service package 2)

Specifically, the lines "a=" placed behind the lines "m=" indicate that the first medium "audio" belongs to Channel 1 of Service package 1, the second medium "video" belongs to Channel 2 of Service package 1, and the third medium "audio" belongs to Channel 1 of Service package 2.

Alternatively, the line "a=" is set as a=<attribute>:<value>.

The attribute in the attribute component is used for identifying the attribute of the IPTV BC service package, and may be a character set or the like. The value in the attribute value component is used for identifying the identifiers of the service package and the channel, and may be a number, a URI, a URL, a character set, a token, or the like.

For example, a statement a=BCServicePackage:PID1 1 2 3 indicates that the media corresponding to Channel identifiers 1, 2, 3 belong to IPTV BC service package PID1.

A set line "a=" may be a session-level attribute.

That is, the line "a=<attribute>:<value>" placed before the first media line "m=" is a session-level attribute, indicating that all the media corresponding to the channel identifier in the value belong to the service package identifier of the value. The media corresponding to the media identifier are identified by a media channel attribute line.

In the following example, the line "a=" is placed before the first line "m=" for indicating the session-level attribute.

a=BCServicePackage_channel:1_1 (Channel 1 in Service package 1)
m=audio 49170 RTP/AVP 0
m=video 49172 RTP/AVP 99
m=audio 39170 RTP/AVP 0
a=BCServicePackage_channel:2_1 (Channel 1 in Service package 2)

Specifically, the line "a=" placed before the first line "m=" indicates that the first medium "audio" and the second medium "video" both belong to Channel 1 in Service package 1, and the third medium "audio" belongs to Channel 1 in Service package 2.

In the following example, the service package attribute line "a=" is a session-level attribute, and the channel attribute line "a=" is a media-level attribute.

a=BCServicePackage:PID1 1 2 3 (Channels 1, 2, 3 belong to Service package PID1)
m=audio 49170 RTP/AVP 0
a=BCchannel:1 (Channel 1)
m=video 49172 RTP/AVP 99
a=BCchannel:2 (Channel 2)
m=audio 39170 RTP/AVP 0
a=BCchannel:3 (Channel 3)

Specifically, the service package attribute line "a=" placed before the first line "m=" indicates that Channels 1, 2, 3 belong to Service package PID1. The channel attribute lines "a=" behind each media line identify that the first medium "audio", the second medium "video", and the third medium "audio" belong to Service package PID1.

In Manner 5, the attribute line and the media line are both set to identify the service package and the channel.

Specifically, the line "a=" is added before the first media line "m=", and set as a=<attribute>:<value> for describing a composite attribute line of the service package and the channel. Different service packages or channels are identified with different values.

The attribute in the attribute component is used for identifying a composite attribute of the IPTV BC service package and the channel, and may be a character set or the like. The value in the attribute value component is used for identifying a composite identifier of the service package and the channel, such as a composite name or a composite serial number of the service package and the channel, and may be a number, a URI, a URL, a character set, a token, or the like.

Meanwhile, "a=label:<label pointer>" is added behind each line "m=". The value of the label pointer is selected from the value in the composite attribute line that identifies the service package and the channel, and used for identifying the identifiers of the service package and the channel that the media corresponding to the line "m=" belong to. The media corresponding to the lines "m=" having the same label pointer belong to the same channel of the same service package, and the information about the service package and the channel is identified by the value. For example:

a=BCServicePackage_channel:1_1 (indicating that the attribute is Channel 1 in Service package 1)
a=BCServicePackage_channel:1_2 (indicating that the attribute is Channel 2 in Service package 1)
m=audio 49170 RTP/AVP 0
a=label: 1_1
m=video 49172 RTP/AVP 99
a=label: 1_1
m=audio 39170 RTP/AVP 0
a=label: 1_2

The line "a=" added before the first line "m=" and the attributes of the labels added behind each line "m=" indicate that the first medium "audio" and the second medium "video" both belong to Channel 1 in Service package 1, and the third medium "audio" belongs to Channel 2 in Service package 1.

Alternatively, the line "a=" is set as a=<attribute>:<value>.

The attribute in the attribute component is used for identifying the attribute of the IPTV BC service package, and may be a character set or the like. The value in the attribute value component is used for identifying the identifiers of the service package and the channel, and may be a number, a URI, a URL, a character set, a token, or the like.

Meanwhile, "a=label:<label pointer>" is added behind each line "m=". The value of the label pointer is selected from the value that identifies the service package attribute line, and used for identifying the identifiers of the service package and the channel that the media corresponding to the line "m=" belong to, and the identifiers of the service package and the channel are identified by the value. For example:

a=BCServicePackage:PID1 1 2 3 (Channels 1, 2, 3 belong to Service package PID1)
m=audio 49170 RTP/AVP 0
a=label:1 (Channel 1)
m=video 49172 RTP/AVP 99
a=label:2 (Channel 2)
m=audio 39170 RTP/AVP 0
a=label:3 (Channel 3)

Specifically, the service package attribute line "a=" placed before the first line "m=" indicates that Channels 1, 2, 3 belong to Service package PID1. The tag attribute lines "a=" behind each media line identify that the first medium "audio", the second medium "video", and the third medium "audio" belong to Service package PID1.

In Manner 6, a group attribute line "a=group:" is adopted to associate multiple media lines "m=" to constitute a channel in a service package, so as to identify the service package and the channel.

The adopted attribute line "a=group:" may be: group-attribute="a=group:" semantics *(space identification-tag).

The semantics is used for identifying a composite attribute of an IPTV BC service package and a channel, and may be a character set or the like. The identification-tag is used for identifying different media streams, and may be a number, a token, or the like.

For example, "a=group: BCServicePackage_channel 1 2 3" indicates that the media corresponding to media stream identifiers 1, 2, 3 belong to the same channel of the same service package.

Alternatively, the adopted attribute line "a=group:" may be: group-attribute="a=group:" semantics *(space identification-tag).

The semantics is used for identifying composite information about an IPTV BC service package and a channel, and may be a character set or the like. The identification-tag is used for identifying different media streams, and may be a number, a token, or the like.

For example, "a=group: BCServicePackage1_channel1 1 2 3" indicates that the media corresponding to media stream identifiers 1, 2, 3 belong to Channel 1 in BCServicePackage 1.

Thereby, that the first three lines "m=" belong to a channel of the same service package and the last two lines "m=" belong to a channel of the same service package may be expressed below with the attribute line "a=group:", respectively.

a=group: BCServicePackage_channel 1 2 3 (the semantics is BCServicePackage_channel for identifying that the composite attribute of the IPTV BC service package and the channel is BCServicePackage_channel), or a=group:BCServicePackage1_channel1 1 2 3 (the semantics is BCServicePackage1_channel1 for identifying that the composite identifier of the IPTV BC service package and the channel is channel1 in BCServicePackage1); and a=group: BCServicePackage_channel 4 5 (the semantics is BCServicePackage_channel for identifying that the composite attribute of the IPTV BC service package and the channel is BCServicePackage_channel), or a=group:BCServicePackage1_channel2 4 5 (the semantics is BCServicePackage1_channel2 for identifying the composite identifier of the IPTV BC service package and the channel is channel2 in BCServicePackage1).

m=audio 49170 RTP/AVP 0
a=mid:1
m=video 49172 RTP/AVP 99
a=mid:2
m=text 49174 UDP wb
a=mid:3
m=audio 39170 RTP/AVP 0
a=mid:4
m=video 39172 RTP/AVP 99
a=mid:5

The aforementioned six manners are employed to set the attribute line in the SDP, so as to identify the service package. When the SDP carries media description information corresponding to multiple service packages, if it is necessary to point out the service package information associated with the current service, a default service package may be adopted for identification. It should be noted that, the default service package described herein refers to the service package during system initialization or a specified service package, such as a user-defined service package that is most preferred by the user. The specific identifying method is described in detail below.

2. Process for Identifying the Default Service Package

In this embodiment, the identification of the default service package can be implemented in various manners. It is understandable that, in actual applications, different parameter names or data formats can be adopted depending on specific conditions.

Specifically, the default service package can be identified in the following manners.

In Manner A, a header field of a Session Initialization Protocol (SIP) is combined with descriptions of an SDP service package attribute line for identifying a default service package.

In this manner, if a service package identifier in the SDP service package attribute line is consistent with an identifier, a name, or a serial number of the default service package in the header field of the SIP, it is indicated that the media corresponding to the service package belong to the default service package.

The description of the service package attribute may be implemented in the aforementioned Manner 1, 2, 4, or 5 for identifying a service package. For example, illustration is provided below based on Manner 1 in which the service package attribute is a media-level attribute, and the other manners of describing the service package attribute are similar and may not be repeated herein again.

In the first manner for indicating information about a default service package, if the default service package carried in the header field of the SIP is Service package 1, the SDP is described as follows:

m=audio 49170 RTP/AVP 0
    a=BC_Service_Package:1 (Service package 1)
    m=video 49172 RTP/AVP 99
    a=BC_Service_Package:1 (Service package 1)
    m=audio 39170 RTP/AVP 0
    a=BC_Service_Package:2 (Service package 2)

It indicates that Service package 1 corresponding to the first medium "audio" and the second medium "video" is the default service package.

When the header field of the SIP carries identifiers of the default service package and a channel, the manner for describing the service package attribute may be Manner 4 or 5 for identifying information about a service package. For example, the following embodiment is illustrated based on Manner 4 in which the service package attribute is a media-level attribute and the default service package and the channel are Channel 1 in Service package 1. The SDP is described as follows:

m=audio 49170 RTP/AVP 0
    a=BCServicePackage_channel:1_1 (Channel 1 in Service package 1)
    m=video 49172 RTP/AVP 99
    a=BCServicePackage_channel:1_2 (Channel 2 in Service package 1)
    m=audio 39170 RTP/AVP 0
    a=BCServicePackage_channel:2_1 (Channel 1 in Service package 2)

Specifically, the lines "a=" placed behind the lines "m=" indicate that the first medium "audio" belongs to Channel 1 of Service package 1 and then it can be known that, the first medium "audio" belongs to the default channel of the default service package according to information about the default service package and the channel carried in the header field of the SIP, the second medium "video" belongs to Channel 2 of Service package 1, and the third medium "audio" belongs to Channel 1 of Service package 2.

The first manner of identifying a default service package is introduced above. In this manner, the default service package is acknowledged through the header field of the SIP, and is identified in the SDP in the same manner as information about the service package and the channel, that is to say, Manners 1, 2, 4, and 5 for identifying a service package may be adopted. Another manner of identifying a default service package with a default service package attribute line is described in the following.

In Manner B, a default service package attribute line is adopted to identify a default service package in the SDP.

The identification of the default service package with the default service package attribute line may be classified into the following three types.

In Type 1, a=<attribute> is adopted.

The attribute in the attribute component is used for identifying an IPTV BC default service package attribute or identify a composite attribute of an IPTV BC default service package and a channel, and may be a character set or the like. The default service package attribute line "a=" may be a session-level attribute or a media-level attribute.

The line "a=<attribute>" placed before the first media line "m=" is a session-level attribute, indicating that all the media without the media-level service package attribute line belong to the default service package.

The line "a=<attribute>" placed behind the line "m=" is a media-level attribute, indicating that the medium belongs to the default service package.

The default service package attribute line may be combined with the default service package identifier in the header field of the SIP or the service package attribute line to identify the default service package. The service package attribute line may be described in the same manner as Manner 1, 2, 4, or 5 for identifying a service package, and may be a media-level attribute or a session-level attribute.

In all the following embodiments, no essential sequence exists among the default service package attribute lines and the service package attribute lines all at a media level or a session level.

In the following embodiments, the default service package line is a session-level attribute, and is combined with the default service package identifier carried in the header field of the SIP to identify the default service package. The service package attribute line is the media-level attribute in the above Manner 1 for identifying a service package. If the default service package carried in the header field of the SIP is Service package 1, the SDP is described as follows:

a=defaultBCServicePackage
    m=audio 49170 RTP/AVP 0
    m=video 49172 RTP/AVP 99
    m=audio 39170 RTP/AVP 0
    a=BC_Service_Package:2 (Service package 2)

It indicates that the service packages corresponding to the first medium "audio" and the second medium "video" are default service packages and both belong to Service package 1, and the third medium "audio" belongs to Service package 2.

If the service package attribute line is the media-level attribute in Manner 4 adopted for identifying a service package, and it is assumed that the default service package information carried in the header field of the SIP is Channel 1 in Service package 1, the SDP is described as follows:

a=defaultBCServicePackage_channel
    m=audio 49170 RTP/AVP 0
    m=video 49172 RTP/AVP 99
    m=audio 39170 RTP/AVP 0
    a=BCServicePackage_channel:1_2 (Channel 2 in Service package 1)

It indicates that the service packages corresponding to the first medium "audio" and the second medium "video" are default service packages and both belong to Channel 1 in Service package 1, and the third medium "audio" belongs to Channel 2 of Service package 1.

The manners of identifying the default service package line being a media-level attribute are similar and may not be repeated herein again.

In the following embodiment, the default service package line is a media-level attribute, and is combined with the service package attribute line to identify the default service package. The service package attribute line is the media-level attribute in Manner 1 adopted for identifying a service package. The SDP is described as follows:

m=audio 49170 RTP/AVP 0
    a=BC_Service_Package:1 (Service package 1)
    a=defaultBCServicePackage (Default service package)
    m=video 49172 RTP/AVP 99
    a=BC_Service_Package:1 (Service package 1)

a=defaultBCServicePackage (Default service package) (or alternative)
m=audio 39170 RTP/AVP 0
a=BC_Service_Package: 2 (Service package 2)

The media-level service package attribute line indicates that the first medium "audio" and the second medium "video" both belong to Service package 1, and the third medium "audio" belongs to Service package 2. The media-level default service package identifier line indicates that Service package 1 is a default service package. The service package attribute and the default service package attribute can be identified behind the first media line belonging to the same default service package, and only the default service package attribute or the service package attribute line needs to be pointed out behind the lines of the subsequent media (referring to the second medium "video" herein).

If the service package attribute line is the media-level attribute in Manner 4 adopted for identifying a service package, and it is assumed that information about the default service package carried in the header field of the SIP is Channel 1 in Service package 1, the description regarding the SDP is similar to that in the above embodiment, and the differences merely lie in replacing the default service package attribute line with "a=defaultBCServicePackage_channel" and replacing the service package attribute line with "a=BCServicePackage_channel:x_x".

In the following embodiment, the default service package line is a media-level attribute, and is combined with the service package attribute line to identify the default service package. The service package attribute line is the session-level attribute in Manner 1 adopted for identifying a service package. The SDP is described as follows:

a=BC_Service_Package:1 (Service package 1)
m=audio 49170 RTP/AVP 0
a=defaultBCServicePackage (Default service package)
m=video 49172 RTP/AVP 99
a=defaultBCServicePackage(Default service package) (optional)
m=audio 39170 RTP/AVP 0
a=BC_Service_Package:2 (Service package 2)

The session-level service package attribute line indicates that the first medium "audio" and the second medium "video" both belong to Service package 1, the media-level attribute line indicates that the third medium "audio" belongs to Service package 2, and the media-level default service package identifier line indicates that Service package 1 is a default service package. The default service package attribute may also be identified behind the first media line belonging to the same default service package, and it is allowable that no default service package attribute line exists behind the lines of the subsequent media (referring to the second medium "video" herein).

If the service package attribute line is a session-level attribute in Manner 4 adopted for identifying a service package, and it is assumed that the default service package information carried in the header field of the SIP is Channel 1 in Service package 1, the description regarding the SDP is similar to that in the above embodiment, and the differences merely lie in replacing the default service package attribute line with "a=defaultBCServicePackage_channel" and replacing the service package attribute line with "a=BCServicePackage_channel:x_x".

The default service package line is a media-level attribute or a session-level attribute, and is combined with the service package attribute identifier to identify the default service package in the same manner as Manner 2, 4, or 5 adopted for identifying a service package, which may not be repeated herein again.

In Type 2, a=<attribute>:<value> is adopted.

The attribute in the attribute component is used for identifying an IPTV BC default service package attribute or identify a composite attribute of an IPTV BC default service package and a channel, and may be a character set or the like. The value in the attribute value component is used for identifying the default service package or a composite identifier of the IPTV BC default service package and the channel, such as a composite name or a composite serial number of the service package and the channel, and may be a number, a URI, a URL, a character set, a token, or the like.

The default service package attribute line "a=" may be a session-level attribute or a media-level attribute.

The line "a=<attribute>:<value>" placed before the first media line "m=" is a session-level attribute, indicating that all the media with the service package attribute value being the value belong to the default service package or all the media without the service package attribute line belong to the default service package with the service package value being the value.

The line "a=<attribute>:<value>" placed behind the line "m=" is a media-level attribute, indicating that the medium belongs to the default service package with the value.

The default service package attribute line may be adopted independently, or combined with the default service package identifier in the header field of the SIP or combined with the service package attribute line to identify the default service package. The service package attribute line may be described in the above six manners adopted for identifying a service package, and may be a media-level attribute or a session-level attribute.

In the following embodiment, the default service package attribute is illustrated by "a=defaultBCServicePackage:" or "a=defaultBCServicePackage_channel: x_x", and may also be described in other manners.

In the following embodiment, a default service package line is a session-level attribute, and configured to independently identify a default service package. For example, the service package attribute line is a media-level attribute in Manner 1 adopted for identifying a service package, and the SDP is described as follows:

a=defaultBCServicePackage:1 (the default service package is Service package 1)
m=audio 49170 RTP/AVP 0
m=video 49172 RTP/AVP 99
m=audio 39170 RTP/AVP 0
a=BC_Service_Package:2 (Service package 2)

Specifically, the default service package attribute line "a=" placed before the first line "m=" indicates that the service packages corresponding to the first medium "audio" and the second medium "video" are default service packages and both belong to Service package 1, and the media-level service package attribute line "a=" indicates that the third medium "audio" belongs to Service package 2.

If the service package attribute line is a media-level attribute in the manner adopted for identifying a service package, the description regarding the SDP is similar to that in the above embodiment, and the differences merely lie in replacing the default service package attribute line with "a=defaultBCServicePackage_channel:x_x" and replacing the service package attribute line with "a=BCServicePackage_channel:x_x".

The manner of describing the SDP in which the default service package line is a media-level attribute in Manner 1 or 4 is the same as the next embodiment.

In the following embodiment, the default service package line is a media-level attribute, and is consistent with an identifier, a name, or a serial number of the default service package carried in the header field of the SIP to identify the default service package. For example, if the service package attribute line is a media-level attribute in Manner 1 adopted for identifying a service package, and it is assumed that the default service package carried in the header field of the SIP is Service package 1, the SDP is described as follows:

m=audio 49170 RTP/AVP 0
    a=defaultBCServicePackage:1 (the default service package is Service package 1)
    m=video 49172 RTP/AVP 99
    a=defaultBCServicePackage:1 (the default service package is Service package 1)
    m=audio 39170 RTP/AVP 0
    a=BC_Service_Package:2 (Service package 2)

It indicates that the first medium "audio" and the second medium "video" both belong to Default service package 1.

If the service package attribute line is a media-level attribute in Manner 4 adopted for identifying a service package, the description of the SDP is similar to that in the above embodiment, and the differences merely lie in replacing the default service package attribute line with "a=defaultBCServicePackage_channel:x_x" and replacing the service package attribute line with "a=BCServicePackage_channel:x_x". The method of describing SDP in which the default service package line is a media-level attribute in Manner 1 or 4 is the same as the above embodiment.

In the following embodiment, the default service package line is a media-level attribute, and is combined with the service package attribute line to identify the default service package. For example, the service package attribute line is a media-level attribute in Manner 1 adopted for identifying a service package. The SDP is described as follows:

m=audio 49170 RTP/AVP 0
    a=BC_Service_Package:1 (Service package 1)
    a=defaultBCServicePackage:1 (Default service package)
    m=video 49172 RTP/AVP 99
    a=BC_Service_Package:1 (Service package 1)
    a=defaultBCServicePackage:1 (Default service package) (or alternative)
    m=audio 39170 RTP/AVP 0
    a=BC_Service_Package:2 (Service package 2)

The media-level service package attribute line indicates that the first medium "audio" and the second medium "video" both belong to Service package 1, and the third medium "audio" belongs to Service package 2. The media-level default service package identifier line further indicates that Service package 1 is a default service package. The service package attribute and the default service package attribute may also be identified behind the first media line belonging to the same default service package, and only the default service package attribute or the service package attribute line needs to be pointed out behind the lines of the subsequent media (referring to the second medium "video" herein).

If the service package attribute line is a media-level attribute in Manner 4 adopted for identifying a service package, the description of the SDP is similar to that in the above embodiment, and the differences merely lie in replacing the default service package attribute line with "a=defaultBCServicePackage_channel:x_x" and replacing the service package attribute line with "a=BCServicePackage_channel:x_x".

In the following embodiment, the default service package line is a media-level attribute, and is combined with the service package attribute line to identify the default service package. The service package attribute line is a session-level attribute in Manner 1 adopted for identifying a service package. The SDP is described as follows:

a=BC_Service_Package:1 (Service package 1)
    m=audio 49170 RTP/AVP 0
    a=defaultBCServicePackage:1 (Default service package)
    m=video 49172 RTP/AVP 99
    a=defaultBCServicePackage:1 (Default service package) (optional)
    m=audio 39170 RTP/AVP 0
    a=BC_Service_Package:2 (Service package 2)

The session-level service package attribute line indicates that the first medium "audio" and the second medium "video" both belong to Service package 1, the media-level attribute line indicates that the third medium "audio" belongs to Service package 2, and the media-level default service package identifier line further indicates that Service package 1 is a default service package. The default service package attribute may also be identified behind the first media line belonging to the same default service package, and it is allowable that no default service package attribute line exists behind the lines of the subsequent media (referring to the second medium "video" herein).

If the service package attribute line is a session-level attribute in Manner 4 adopted for identifying a service package, the description of the SDP is similar to that in the above embodiment, and the differences merely lie in replacing the default service package attribute line with "a=defaultBCServicePackage_channel:x_x" and replacing the service package attribute line with "a=BCServicePackage_channel:x_x".

A specific example is illustrated as follows. The default service package line is a session-level attribute, and is combined with the service package attribute line to identify the default service package. The service package attribute line is a media-level attribute in Manner 1 adopted for identifying information about a service package. The SDP is described as follows:

a=defaultBCServicePackage:1 (Default service package)
    m=audio 49170 RTP/AVP 0
    a=BC_Service_Package:1 (Service package 1)
    m=video 49172 RTP/AVP 99
    a=BC_Service_Package:1 (Service package 1) (optional)
    m=audio 39170 RTP/AVP 0
    a=BC_Service_Package:2 (Service package 2)

The session-level default service package attribute line indicates that Service package 1 is a default service package. The media-level service package attribute line indicates that the first medium "audio" and the second medium "video" both belong to Default service package 1, and the third medium "audio" belongs to Service package 2. The service package attribute may also be identified behind the first media line belonging to the same default service package, and it is allowable that no service package attribute line exists behind the lines of the subsequent media (referring to the second medium "video" herein).

If the service package attribute line is a media-level attribute in Manner 4 adopted for identifying a service package, the description of the SDP is similar to that in the above embodiment, and the differences merely lie in replacing the default service package attribute line with "a=defaultBCServicePackage_channel:x_x" and replacing the service package attribute line with "a=BCServicePackage_channel:x_x".

In the following embodiment, the default service package line is a session-level attribute, and is combined with the service package attribute line to identify the default service package. The service package attribute line is a session-level attribute in Manner 1 adopted for identifying a service package. The SDP is described as follows:

a=defaultBCServicePackage:1 (Default service package)
   a=BC_Service_Package:1 (Service package 1)
   m=audio 49170 RTP/AVP 0
   m=video 49172 RTP/AVP 99
   m=audio 39170 RTP/AVP 0
   a=BC_Service_Package: 2 (Service package 2)

The session-level default service package attribute line indicates that Service package 1 is a default service package, the session-level service package attribute line indicates that the first medium "audio" and the second medium "video" both belong to Default service package 1, and the media-level service package attribute indicates that the third medium "audio" belongs to Service package 2.

If the service package attribute line is a session-level attribute in Manner 4 adopted for identifying a service package, the description of the SDP is similar to that in the above embodiment, and the differences merely lie in replacing the default service package attribute line with "a=defaultBCServicePackage_channel:x_x" and replacing the service package attribute line with "a=BCServicePackage_channel:x_x".

The default service package line is a media-level attribute or a session-level attribute, and is combined with the service package attribute identifier to identify the default service package in the same manner as Manner 2, 3, 5, or 6 adopted for identifying a service package, which may not be repeated herein again.

In Type 3, "a=group:" semantics "(space identification-tag)" is adopted to identify a default service package.

The semantics is used for identifying an IPTV BC default service package attribute or identify a composite attribute of an IPTV BC default service package and a channel, and may be a character set or the like. The identification-tag is used for identifying different media streams, and may be a number, a token, or the like.

For example, "a=group: defaultBCServicePackage 1 2 3" indicates that the media corresponding to media stream identifiers 1, 2, 3 belong to the default service package.

The default service package attribute line may be combined with the default service package identifier in the header field of the SIP or the service package attribute line to identify service package identifier information about the default service package. The service package attribute line may be described in the above six manners adopted for identifying a service package, and may be a media-level attribute or a session-level attribute.

In the following embodiment, the default service package line is a session-level attribute. The default service package line and the default service package identifier carried in the header field of the SIP both belong to Service package 1. The service package attribute line is a media-level attribute in Manner 1 adopted for identifying a service package. The SDP is described as follows:

a=group: defaultBCServicePackage 1 2 3 (Default service package)
   m=audio 49170 RTP/AVP 0
   a=mid:1
   m=video 49172 RTP/AVP 99
   a=mid:2
   m=text 49174 UDP wb
   a=mid:3
   m=audio 39170 RTP/AVP 0
   a=BC_Service_Package:2
   a=mid:4
   m=video 39172 RTP/AVP 99
   a=BC_Service_Package:2 (Service package 2)
   a=mid:5

The default service package attribute line indicates that the first three media streams belong to the default service package, and the default service package identifier carried in the header field of the SIP indicates that the first three media streams belong to Default service package 1.

If the service package attribute line is a media-level attribute in Manner 4 adopted for identifying information about a service package, the description of the SDP is similar to that in the above embodiment, and the differences merely lie in replacing the default service package attribute line with "a=group: defaultBCServicePackage_channel x x" and replacing the service package attribute line with "a=BCServicePackage_channel:x_x".

In the following embodiment, the default service package line is a session-level attribute, and is combined with the service package attribute line to identify the default service package. The service package attribute line is a media-level attribute in Manner 1 adopted for identifying a service package. The SDP is described as follows:

a=group: defaultBCServicePackage 1 2 3 (Default service package)
   m=audio 49170 RTP/AVP 0
   a=BC_Service_Package:1 (Service package 1)
   a=mid:1
   m=video 49172 RTP/AVP 99
   a=BC_Service_Package:1 (optional)
   a=mid:2
   m=text 49174 UDP wb
   a=BC_Service_Package:1 (optional)
   a=mid:3
   m=audio 39170 RTP/AVP 0
   a=BC_Service_Package:2
   a=mid:4
   m=video 39172 RTP/AVP 99
   a=BC_Service_Package:2
   a=mid:5

The session-level default service package attribute line indicates that the first three media belong to the default service package. The media-level service package attribute line further indicates that the first three media belong to Default service package 1, and the fourth medium "audio" and the fifth medium "video" belong to Service package 2. The service package attribute may also be identified behind the first media line belonging to the same default service package, and it is allowable that no service package attribute line exists behind the lines of the subsequent media (referring to the second medium "video" herein).

If the service package attribute line is a media-level attribute in Manner 4 adopted for identifying information about a service package, the description of the SDP is similar to that in the above embodiment, and the differences merely lie in replacing the default service package attribute line with "a=group: defaultBCServicePackage_channel x x" and replacing the service package attribute line with "a=BCServicePackage_channel:x_x".

In the following embodiment, the default service package line is a session-level attribute, and is combined with the service package attribute line to identify the default service package. The service package attribute line is a session-level attribute in Manner 1 adopted for identifying a service package. The SDP is described as follows:

a=group: defaultBCServicePackage 1 2 3 (Default service package)
    a=BC_Service_Package:1 (Service package 1)
    m=audio 49170 RTP/AVP 0
    a=mid:1
    m=video 49172 RTP/AVP 99
    a=mid:2
    m=text 49174 UDP wb
    a=mid:3
    m=audio 39170 RTP/AVP 0
    a=BC_Service_Package:2
    a=mid:4
    m=video 39172 RTP/AVP 99
    a=BC_Service_Package:2
    a=mid:5

The session-level default service package attribute line indicates that the first three media belong to the default service package. The session-level service package attribute line further indicates that the first three media belong to Default service package 1, and the fourth medium "audio" and the fifth medium "video" of the media-level service package attribute line belong to Service package 2.

If the service package attribute line is a session-level attribute in Manner 4 adopted for identifying information about a service package, the description of the SDP is similar to that in the above embodiment, and the differences merely lie in replacing the default service package attribute line with "a=group: defaultBCServicePackage_channel x x" and replacing the service package attribute line with "a=BCServicePackage_channel:x_x".

The default service package line is a media-level attribute or a session-level attribute, and is combined with the service package identifier to identify the default service package in the same manner as Manner 2, 3, 5, or 6 adopted for identifying a service package, which may not be repeated herein again.

In Manner C, a default service package is indicated, and the default service package is identified with an attribute line.

In this manner, the session-level service package attribute line is used for identifying the default service package, and the media-level service package attribute line is used for identifying the service package that each medium belongs to. The service package attribute line may be described in the above six manners adopted for identifying a service package.

In the following embodiment, the session-level service package attribute and the media-level service package attribute both adopt Manner A for identifying a service package as an example, and the SDP is described as follows:

a=BC_Service_Package:1 (Service package 1) session-level
    m=audio 49170 RTP/AVP 0
    a=BC_Service_Package:1 (Service package 1)
    m=video 49172 RTP/AVP 99
    a=BC_Service_Package:1 (Service package 1)
    m=audio 39170 RTP/AVP 0
    a=BC_Service_Package:2 (Service package 2)

The session-level service package attribute line identifies the default service package as Service package 1, and then the media-level service package attribute line identifies the service package that the medium belongs to. Accordingly, it can be known that the first medium "audio" and the second medium "video" belong to Default service package 1.

If the service package attribute line is a session-level attribute and a media-level attribute in Manner 4 adopted for identifying a service package, the description of the SDP is similar to that in the above embodiment, and only the session-level and media-level default service package attribute lines "a=BCServicePackage_channel:x_x" are replaced.

In this manner, the service package and the default service package are respectively identified. It is understandable that, the specific setting means, parameter name, and data format may not be limited in this embodiment.

In step 103, the service message carrying the SDP is sent to a second NE.

The second NE is a network element that receives the service message sent by the first NE. In this embodiment, for example, a server functions as the second NE. It is understandable that, the second NE may also be other NEs that receive the service message, which is not limited herein.

The first NE, after carrying the service package identifier and/or the channel identifier into the SDP, sends the service message carrying the SDP to the second NE, so as to request to perform a corresponding BC service.

In step 104, the second NE receives the service message carrying the SDP sent by the first NE.

In step 105, the service package information contained in the SDP is parsed.

The second NE, after receiving the service message, reads from the SDP of the service message the service package corresponding to the service package information that media components belong to and required by the current service contained in the SDP.

According to the setting of the SDP in step 103, the parsing the service package identifier contained in the SDP may include: parsing a corresponding attribute line from the SDP, and obtaining the service package information from a parameter value in the attribute line.

For ease of description, several specific examples may be adopted to illustrate the identification of the service package information and the obtaining of the corresponding service package information according to the embodiment of the present invention. The following circumstances may occur.

Firstly, the identification of the service package information according to the embodiment of the present invention may be implemented in the following manners.

(1) Setting an Attribute Line to Identify the Service Package Information

In this manner, the attribute line "a=" in the SDP is configured to identify the service package information, which includes the following steps.

A service package attribute is set in an attribute component of the attribute line in the SDP, and a service package identifier corresponding to the service package attribute is set in an attribute value component of the attribute line in the SDP.

In order to introduce the aforementioned manner more clearly, the specific implementation is illustrated with an example.

In actual applications, a specific form of the attribute line is: a=<attribute>:<value>.

The attribute in the attribute component of the attribute line is used for identifying the attribute of an IPTV BC service package, and may be a character set or the like. The value in the attribute value component of the attribute line is the service package identifier, such as a name or serial number of the service package, and may be a number, a URI, a URL, a character set, a token, or other types of identifiers.

For ease of illustration, a specific example is provided in the following.

The service package attribute is set as BC_Service_Package in the component <attribute>, the service package identifier is set as 1 in the component <value>, and the formed attribute line is a=BC_Service_Package:1.

The specific application of this manner in the SDP has been described in the above embodiment, and may not be repeated herein again.

(2) Setting an Attribute Line and a Media Line to Together Identify the Service Package Information The specific implementation includes the following steps.

A service package attribute is set in an attribute component of the attribute line in the SDP, and a service package identifier corresponding to the service package attribute is set in an attribute value component of the attribute line in the SDP.

In order to introduce the aforementioned manner more clearly, the specific implementation is illustrated with an example.

In actual applications, a specific form of the attribute line is: a=<attribute>:<value>.

The attribute in the attribute component of the attribute line is used for identifying the attribute of an IPTV BC service package, and may be a character set or the like. The value in the attribute value component of the attribute line is the service package identifier, such as a name or serial number of the service package, and may be a number, a URI, a URL, a character set, a token, or other types of identifiers.

For ease of illustration, a specific example is provided in the following.

The service package attribute is set as BC_Service_Package in the component <attribute>, the service package identifier is set as 1 in the component <value>, and the formed attribute line is a=BC_Service_Package:1.

The line "a=" added before the first line "m=" is set as "a=<attribute>:<value>" for describing the service package attribute line. Different service packages are identified with different values. Meanwhile, "a=label:<label pointer>" is added behind each line "m=". The value of the label pointer in a tag value component is selected from the value that identifies the service package, and used for identifying the service package that the line "m=" belongs to. The media corresponding to the lines "m=" having the same label pointer belong to the same service package, and the service package information is identified by the value.

The specific application of this manner in the SDP has been described in the above embodiment, and may not be repeated herein again.

(3) Setting an Attribute Line to Identify the Service Package and the Channel

The specific implementation includes the following steps.

A composite attribute of the service package and the channel is set in an attribute component of the attribute line in the SDP, and a composite identifier of the service package and the channel corresponding to the composite attribute of the service package and the channel is set in an attribute value component of the attribute line in the SDP.

In order to introduce the aforementioned manner more clearly, the specific implementation is illustrated with an example.

The line "a=" may be set as: a=<attribute>:<value>. The attribute in the attribute component of the attribute line is used for identifying a composite attribute of an IPTV BC service package and a channel, and may be a character set or the like. The value in the attribute value component of the attribute line is a composite identifier of the service package and the channel, such as a composite name or a composite serial number of the service package and the channel, and may be a number, a URI, a URL, a character set, a token, or the like.

For ease of illustration, a specific example is provided in the following.

The composite attribute of the service package and the channel is set as BCServicePackage_channel in the component <attribute>, the composite identifier of the service package and the channel is set as 1_1 in the component <value>, and the formed attribute line is a=BCServicePackage_channel:1_1.

The specific application of this manner in the SDP has been described in the above embodiment, and may not be repeated herein again.

(4) Setting a Group Attribute Line to Identify the Service Package Information

The specific implementation includes the following steps.

A service package identifier is set in a semantics component of the group attribute line in the SDP, and a channel identifier is set in an identification-tag component of the group attribute line in the SDP.

In order to introduce the aforementioned manner more clearly, the specific implementation is illustrated with an example.

The attribute line "a=group:" may be adopted as: group-attribute="a=group:" semantics *(space identification-tag).

The semantics is used for identifying an IPTV BC service package identifier, and may be a character set or the like. The identification-tag is used for indicating a channel identifier, and may be a number, a token, or the like.

For ease of illustration, a specific example is provided in the following.

The attribute line is set as a=group:BC_Service_Package1 1 2 3, indicating that the media corresponding to Channel identifiers 1, 2, 3 belong to the service package with the service package identifier of BC_Service_Package1.

The channel attribute line is added behind each line "m=", indicating the channel that the medium corresponding to the attribute line belongs to, which is shown as follows:

m=audio 49170 RTP/AVP 0
a=BC_Channel:1 (Channel 1)

The above embodiment merely describes the condition that the channel attribute line serves as the media-level attribute, but other usages may also exist. The specific description of the parameter form of the channel attribute line is not limited to the description of the manner in the above embodiment.

The specific application of this manner in the SDP has been described in the above embodiment, and may not be repeated herein again.

(5) Setting an Attribute Line to Identify the Service Package and the Channel in Another Case The specific implementation includes the following steps.

A service package attribute is set in an attribute component of the attribute line in the SDP, and a service package identifier and a channel identifier are set in an attribute value component of the attribute line in the SDP.

In order to introduce the aforementioned manner more clearly, the specific implementation is illustrated with an example.

The line "a=" is set as: a=<attribute>:<value>.

The attribute in the attribute component is used for identifying an attribute of an IPTV BC service package, and may be a character set or the like. The value in the attribute value component is used for identifying a service package and a channel, and may be a number, a URI, a URL, a character set, a token, or the like.

For example, a statement a=BCServicePackage:PID1 1 2 3 indicates that the media with Channel identifiers 1, 2, 3 belong to IPTV BC service package PID1.

The specific application of this manner in the SDP has been described in the above embodiment, and may not be repeated herein again.

(6) Setting a Default Service Package Attribute Line and a Service Package Attribute Line to Together Identify the Default Service Package Information The specific implementation includes the following steps.

A service package attribute is set in an attribute component of a first attribute line in the SDP, and a service package identifier corresponding to the service package attribute is set in an attribute value component of the first attribute line in the SDP.

The service package is set as a default service package in an attribute component of a second attribute line in the SDP.

In order to introduce the aforementioned manner more clearly, the specific implementation is illustrated with an example.

The attribute lines are set in the SDP. The first line is the service package attribute line, and the second line is the default service package attribute line. The former has a structure of a=<attribute><value>, and the latter has a structure of a=<attribute>. The details are described as follows.

The attribute of the service package is set as BC_Service_Package in the component <attribute> of the attribute component of the service package attribute line, the service package identifier is set as 1 in the component <value> of the attribute value component, and the attribute of the default service package is set as defaultBCServicePackage in the component <attribute> of the attribute component of the default service package attribute line. Thereby, the formed attribute lines are: a=BC_Service_Package:1 (Service package 1) and a=defaultBCServicePackage (Default service package).

The first line indicates that the attribute of the service package is BC_Service_Package, and the service package identifier is 1. The second line indicates that the service package is a default service package.

The specific application of this manner in the SDP has been described in the above embodiment, and may not be repeated herein again.

(7) Setting a Default Service Package Attribute Line to Identify the Default Service Package Information The specific implementation includes the following steps.

A default service package attribute is set in an attribute component of the attribute line in the SDP, and a default service package identifier corresponding to the default service package attribute is set in an attribute value component of the attribute line in the SDP.

In order to introduce the aforementioned manner more clearly, the specific implementation is illustrated with an example.

The line "a=" may be set as: a=<attribute>:<value>. The attribute in the attribute component of the attribute line is used for identifying the attribute of the default service package, and may be a character set or the like. The value in the attribute value component of the attribute line is the default service package identifier.

The default service package attribute is set as defaultBCServicePackage in the component <attribute>, the default service package identifier is set as 1 in the component <value>, and the formed attribute line is: a=defaultBCServicePackage:1.

The specific application of this manner in the SDP has been described in the above embodiment, and may not be repeated herein again.

(8) Setting a Service Package Attribute Line to Identify the Default Service Package Information The specific implementation includes the following steps.

A default service package attribute is set in an attribute component of the attribute line in the SDP.

In order to introduce the aforementioned manner more clearly, the specific implementation is illustrated with an example.

In this manner, a=<attribute> is adopted.

The attribute in the attribute component is used for identifying an IPTV BC default service package attribute or identify a composite attribute of an IPTV BC default service package and a channel, and may be a character set or the like.

In this manner, the default service package identifier is obtained depending on the header field of the SIP or other attribute lines.

The specific application of this manner in the SDP has been described in the above embodiment, and may not be repeated herein again.

The manners of identifying the service package information have been introduced above. The service package information may be obtained in the following manners according to the embodiment of the present invention.

(1) Setting an Attribute Line to Identifying the Service Package Information

The specific implementation includes the following steps.

The SDP is parsed to obtain the attribute line.

An attribute component of the attribute line is parsed to obtain a service package attribute, and an attribute value component of the attribute line is parsed to obtain a service package identifier corresponding to the service package attribute.

In order to introduce the aforementioned manner more clearly, the specific implementation is illustrated with an example.

An attribute line a=BC_Service_Package:1 is obtained by parsing, a component <attribute> of an attribute component of the attribute line is then parsed to obtain a service package attribute of BC_Service_Package, and a component <value> of an attribute value component of the attribute line is parsed to obtain a service package identifier of 1.

(2) Setting an Attribute Line and a Media Line to Together Identify the Service Package Information The specific implementation includes the following steps.

The SDP is parsed to obtain the attribute line.

An attribute component of the attribute line is parsed to obtain a service package attribute, and an attribute value component of the attribute line is parsed to obtain a service package identifier corresponding to the service package attribute.

In order to introduce the aforementioned manner more clearly, the specific implementation is illustrated with an example.

An attribute line a=BC_Service_Package:1 is obtained by parsing, a component <attribute> of an attribute component of the attribute line is then parsed to obtain a service package attribute of BC_Service_Package, and a component <value> of an attribute value component of the attribute line is parsed to obtain a service package identifier of 1.

In this manner, after the attribute line is parsed, a tag line a=label:<label pointer> behind the media line also needs to be parsed. The label is a tag component, the <label pointer> is a tag value component, and the value of the <label pointer> is selected from the value of the service package. A specific embodiment is illustrated below with the above attribute line.

Firstly, the SDP is parsed to obtain an attribute line a=BC_Service_Package:1, a component <attribute> of an attribute component of the attribute line is then parsed to obtain a service package attribute of BC_Service_Package, and a component <value> of an attribute value component of the attribute line is parsed to obtain a service package identifier of 1.

A tag line a=label:1 behind the media line is parsed, a tag component <label> of the tag line is parsed to obtain the fact that the line is a tag line, and a tag value component <pointer> of the tag line is parsed to learn that the tag value is 1, that is, the service package identifier that the media line corresponding to the tag line belongs to is 1.

The specific implementation of this manner has been described in the above embodiment, and may not be repeated herein again.

(3) Setting an Attribute Line to Identify the Service Package and the Channel

The specific implementation includes the following steps.

The SDP is parsed to obtain the attribute line.

An attribute component of the attribute line is parsed to obtain a composite attribute of the service package and the channel, and an attribute value component of the attribute line is parsed to obtain a composite identifier of the service package and the channel corresponding to the composite attribute of the service package and the channel.

In order to introduce the aforementioned manner more clearly, the specific implementation is illustrated with an example.

An attribute line a=BCServicePackage_channel:1_1 is obtained by parsing, a component <attribute> of an attribute component of the attribute line is parsed to obtain a composite attribute of the service package and the channel as BCServicePackage_channel, and a component <value> of an attribute value component of the attribute line is parsed to obtain a composite identifier of the service package and the channel as 1_1, that is, Channel 1 of Service package 1.

(4) Setting a Group Attribute Line to Identify the Service Package Information

The specific implementation includes the following steps.

The SDP in a received service message is parsed to obtain the group attribute line.

A semantics component of the group attribute line is parsed to obtain a service package identifier, and an identification-tag of the group attribute line is parsed to obtain a channel identifier.

In order to introduce the aforementioned manner more clearly, the specific implementation is illustrated with an example.

A group attribute line: group-attribute="a=group:" semantics *(space identification-tag) is obtained by parsing.

Then, a semantics component is parsed to obtain an IPTV BC service package identifier, which may be a character set or the like. An identification-tag is parsed to indicate a channel identifier, which may be a number, a token, or the like.

Afterward, a channel attribute line added behind each line "m=" is parsed to learn the channel that the media line corresponding to the attribute line belongs to.

(5) Setting an Attribute Line to Identify the Service Package and the Channel in Another Case The specific implementation includes the following steps.

The SDP in a received service message is parsed to obtain the attribute line.

An attribute component of the attribute line is parsed to obtain a service package attribute, and an attribute value component of the attribute line is parsed to obtain a service package identifier and a channel identifier.

In order to introduce the aforementioned manner more clearly, the specific implementation is illustrated with an example.

An attribute line a=<attribute>:<value> is obtained by parsing.

Then, an attribute in the attribute component is parsed to obtain an IPTV BC service package attribute, which may be a character set or the like. Afterward, a value in the attribute value component is parsed to obtain a service package identifier and a channel identifier, which may be a number, a URI, a URL, a character set, a token, or the like.

(6) Setting a Default Service Package Attribute Line and a Service Package Attribute Line to Together Identify the Default Service Package Information The specific implementation includes the following steps.

The SDP is parsed to obtain the attribute line.

An attribute component of a first attribute line is parsed to obtain a service package attribute, and an attribute value component of the first attribute line is parsed to obtain a service package identifier corresponding to the service package attribute.

An attribute component of a second attribute line is parsed to learn that the service package is a default service package.

In order to introduce the aforementioned manner more clearly, the specific implementation is illustrated with an example.

The attribute lines are obtained by parsing:

a=BC_Service_Package:1 a=defaultBCServicePackage

The attribute component <attribute> of the attribute line in the first line is parsed to obtain that the service package has an attribute of BC_Service_Package, the attribute value component <value> of the attribute line in the first line is parsed to obtain that the service package has an identifier of 1, and the <attribute> of the attribute line in the second line is parsed to obtain that the service package has an attribute of defaultBCServicePackage.

(7) Setting a Default Service Package Attribute Line to Identify the Default Service Package Information The specific implementation includes the following steps.

The SDP is parsed to obtain the attribute line.

An attribute component of the attribute line is parsed to obtain a default service package attribute, and an attribute value component of the attribute line is parsed to obtain a default service package identifier corresponding to the default service package attribute.

In order to introduce the aforementioned manner more clearly, the specific implementation is illustrated with an example.

An attribute line: a=defaultBCServicePackage:1 is obtained by parsing, a component <attribute> of an attribute component of the attribute line is parsed to obtain a default service package attribute of defaultBCServicePackage, and a component <value> of an attribute value component of the attribute line is parsed to obtain a default service package identifier of 1.

(8) Setting a Service Package Attribute Line to Identify the Default Service Package Information The specific implementation includes the following steps.

The SDP in a received service message is parsed to obtain the attribute line.

In order to introduce the aforementioned manner more clearly, the specific implementation is illustrated with an example.

The attribute line a=<attribute> is obtained by parsing.

Then, an attribute in the attribute component is parsed to obtain an IPTV BC default service package attribute.

It should be noted that, in this manner, the default service package identifier is obtained depending on the header field of the SIP or other attribute lines.

The identification and obtaining of the service package information are illustrated in the above eight manners. It is understandable that, besides these eight manners, other manners described in the above embodiment may also be adopted, which will not be repeated herein again.

In all the embodiments of the present invention, the service package attribute line is an attribute line that describes the service package information, and the default service package attribute line is an attribute line that describes the default service package information.

The embodiments of the medium resource reservation method in the present invention are introduced below. In all the following embodiments, a BC service in an IMS-based IPTV system is used as an example. It is understandable that, other types of services may also be adopted, which are not limited herein.

Figure 2:
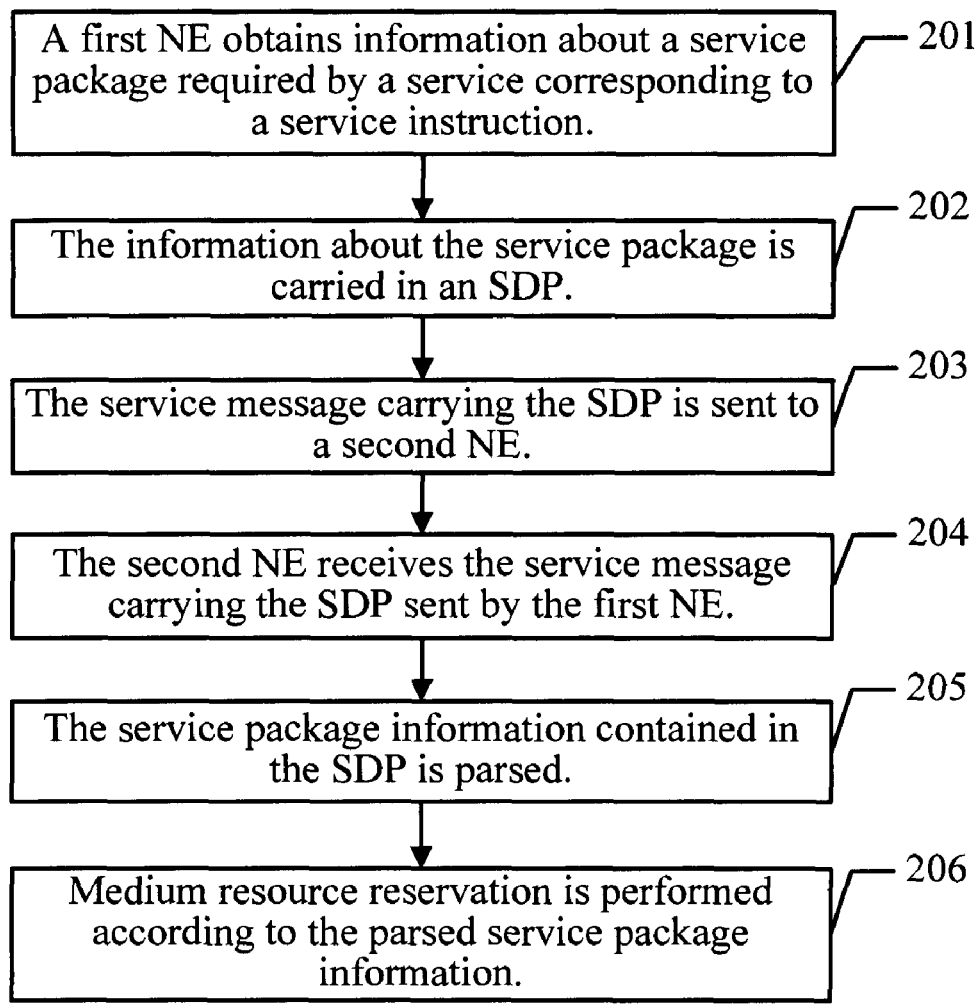
FIG. 2 is a flow chart of a medium resource reservation method according to an embodiment of the present invention.

Referring to FIG. 2, a medium resource reservation method in an embodiment of the present invention includes the following steps.

In step 201, a first NE obtains information about a service package required by a service corresponding to a service instruction.

In all the embodiments of the present invention, the service instruction or a service message may be an INVITE message for establishing an SIP session.

In this embodiment, the first NE, after receiving the service instruction, obtains the information about the service package required by the service corresponding to the service instruction.

In step 202, the information about the service package is carried in an SDP.

A specific carrying means is to set an attribute line in the SDP.

The specific identification may be classified according to the types of the service package, namely, identification of information about a service package and identification of information about a default service package. A detailed identification process has been described in the service package information obtaining method, and will not be repeated herein again.

In step 203, the service message carrying the SDP is sent to a second NE.

The second NE is a network element that receives the service message sent by the first NE. In this embodiment, for example, a server functions as the second NE. It is understandable that, the second NE may also be other NEs that receive the service message, which is not limited herein.

In step 204, the second NE receives the service message carrying the SDP sent by the first NE.

In step 205, the service package information contained in the SDP is parsed.

The second NE, after receiving the service message, reads from the SDP of the service message the service package corresponding to the service package information that media components belong to and required by the current service contained in the SDP.

In step 206, medium resource reservation is performed according to the service package information corresponding to the parsed service package information.

In this embodiment, the medium resource reservation includes: obtaining the media components contained in the service package; and reserving media resources of the media components.

In the embodiment of the present invention, as the second NE receives the service message sent by the first NE and extracts the corresponding service package information from the SDP of the service message, the second NE learns the service package that is required by the service and requested by the first NE, and performs media processing on the required service package. For example, the second NE may perform medium resource reservation on the media components required by the first NE, instead of all the resources, so as to reduce resource waste of medium resource reservation.

In the embodiment, the first NE may be user equipment (UE), and may also be other equipment capable of sending an SDP, such as a service control function (SCF). The second NE may be a server, and may also be other equipment capable of receiving the SDP, such as a resource and admission control subsystem (RACS).

Figure 3:
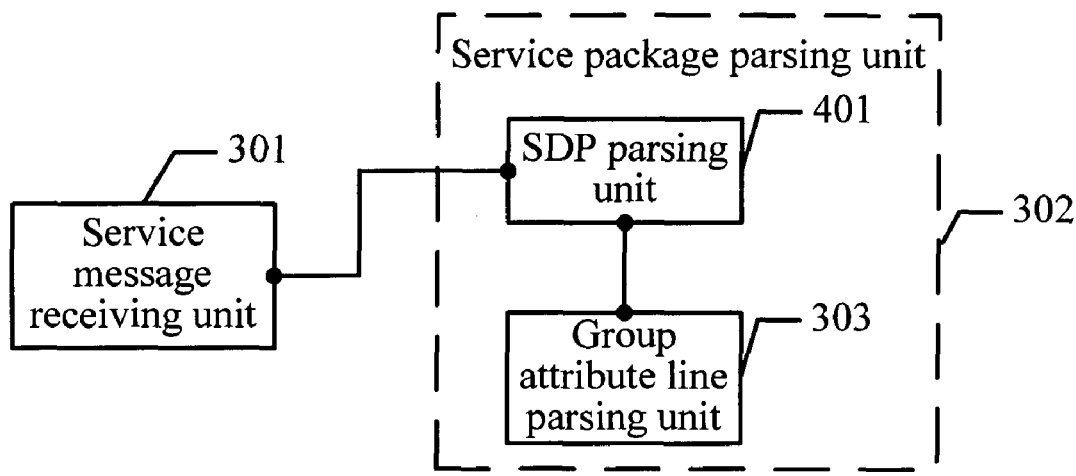
FIG. 3 is a schematic view of a service package information obtaining apparatus according to a first embodiment of the present invention.

In an embodiment of the present invention, a service package information obtaining apparatus is described as follows. Referring to FIG. 3, a first embodiment of the service package information obtaining apparatus includes a service message receiving unit 301 and a service package parsing unit 302.

The service message receiving unit 301 is configured to receive a service message carrying SDP information, the SDP information contains service package information, and the service package information is the information about the service package required for performing the service corresponding to the service message.

The service package parsing unit 302 is configured to parse an attribute line from the SDP information, and parse the service package information from the attribute line. The service package parsing unit 302 further includes an SDP parsing unit 401 and a group attribute line parsing unit 303.

The SDP parsing unit 401 is configured to parse the received SDP information to obtain an attribute line.

The group attribute line parsing unit 303 is configured to parse a semantics component of the attribute line to obtain a service package identifier, and parse an identification-tag component of an identification-tag of the attribute line to obtain a channel identifier. In this embodiment, the NE may be a server, and may also be other equipment capable of receiving the SDP, such as an RACS.

Figure 4:
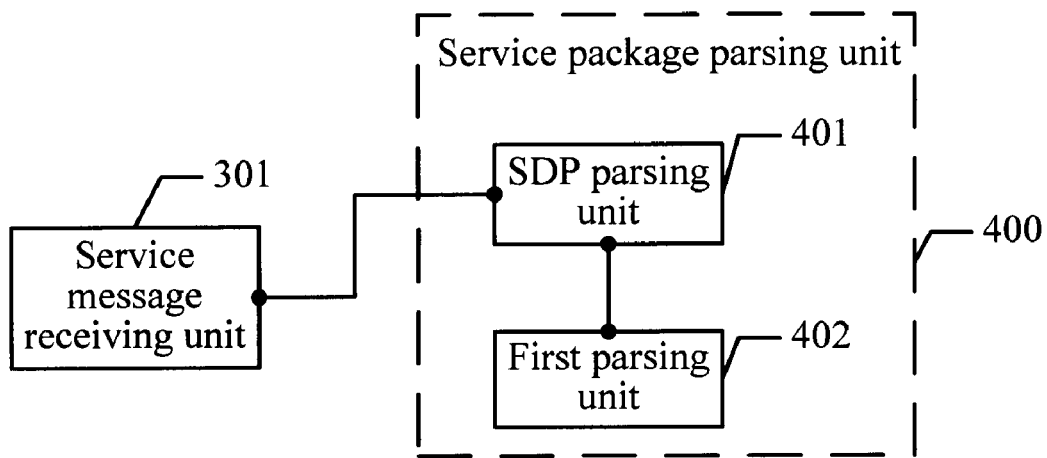
FIG. 4 is a schematic view of a service package information obtaining apparatus according to a second embodiment of the present invention.

Referring to FIG. 4, a second embodiment of the service package information obtaining apparatus includes a service message receiving unit 301 and a service package parsing unit 400.

The service message receiving unit 301 is configured to receive a service message carrying SDP information, the SDP information contains service package information, and the service package information is the information about the service package required for performing the service corresponding to the service message.

The service package parsing unit 400 is configured to parse an attribute line from the SDP information, and parse the service package information from the attribute line. The service package parsing unit 400 further includes an SDP parsing unit 401 and a first parsing unit 402.

The SDP parsing unit 401 is configured to parse the received SDP information to obtain an attribute line.

The first parsing unit 402 is configured to parse an attribute component of the attribute line to obtain a service package attribute, and parse an attribute value component of the attribute line to obtain a service package identifier corresponding to the service package attribute.

Figure 5:
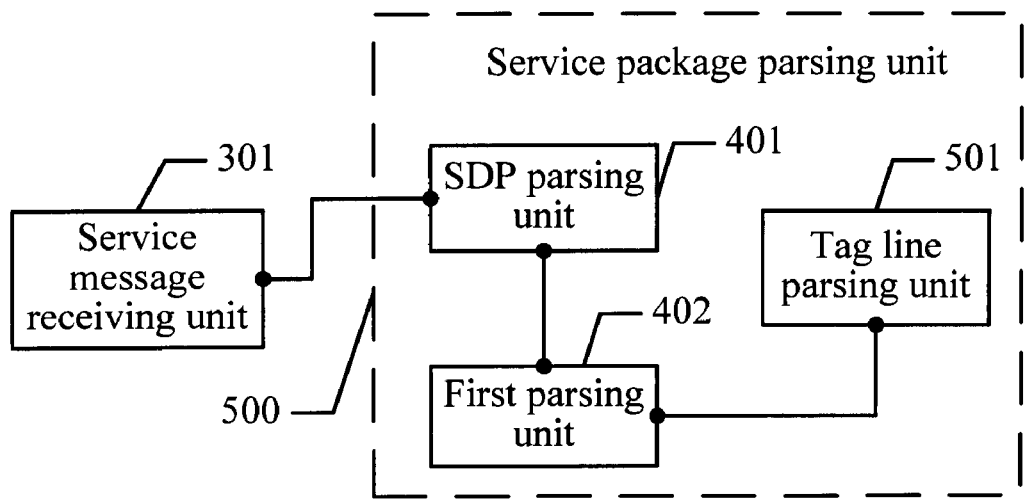
FIG. 5 is a schematic view of a service package information obtaining apparatus according to a third embodiment of the present invention.

Referring to FIG. 5, a third embodiment of the service package information obtaining apparatus includes a service message receiving unit 301 and a service package parsing unit 500.

The service message receiving unit 301 is configured to receive a service message carrying SDP information, the SDP information contains service package information, and the service package information is the information about the service package required for performing the service corresponding to the service message.

The service package parsing unit 500 is configured to parse an attribute line from the SDP information, and parse the service package information from the attribute line. The service package parsing unit 500 further includes an SDP parsing unit 401, a first parsing unit 402, and a tag line parsing unit 501.

The SDP parsing unit 401 is configured to parse the received SDP information to obtain an attribute line.

The first parsing unit 402 is configured to parse an attribute component of the attribute line to obtain a service package attribute, and parse an attribute value component of the attribute line to obtain a service package identifier corresponding to the service package attribute.

The tag line parsing unit 501 is configured to parse a tag value component of a tag line behind a media line to obtain a service package identifier that the media line corresponding to the tag line belongs to. A value of the tag value component is selected from the value of the attribute value component of the attribute line.

Figure 6:
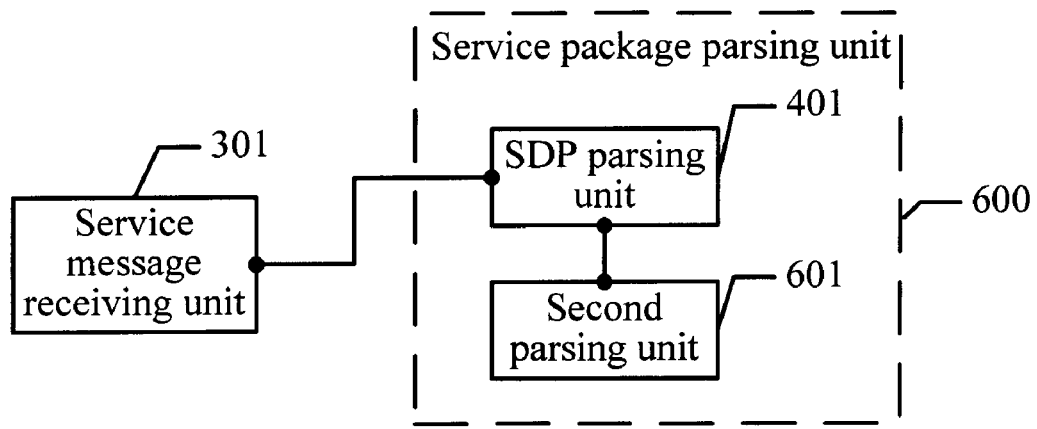
FIG. 6 is a schematic view of a service package information obtaining apparatus according to a fourth embodiment of the present invention.

Referring to FIG. 6, a fourth embodiment of the service package information obtaining apparatus includes a service message receiving unit 301 and a service package parsing unit 600.

The service message receiving unit 301 is configured to receive a service message carrying SDP information, the SDP information contains service package information, and the service package information is the information about the service package required for performing the service corresponding to the service message.

The service package parsing unit 600 is configured to parse an attribute line from the SDP information, and parse the service package information from the attribute line. The service package parsing unit 600 further includes an SDP parsing unit 401 and a second parsing unit 601.

The SDP parsing unit 401 is configured to parse the received SDP to obtain the attribute line.

The second parsing unit 601 is configured to parse an attribute component of the attribute line to obtain a composite attribute of the service package and the channel, and parse an attribute value component of the attribute line to obtain a composite identifier of the service package and the channel corresponding to the composite attribute of the service package and the channel.

Figure 7:
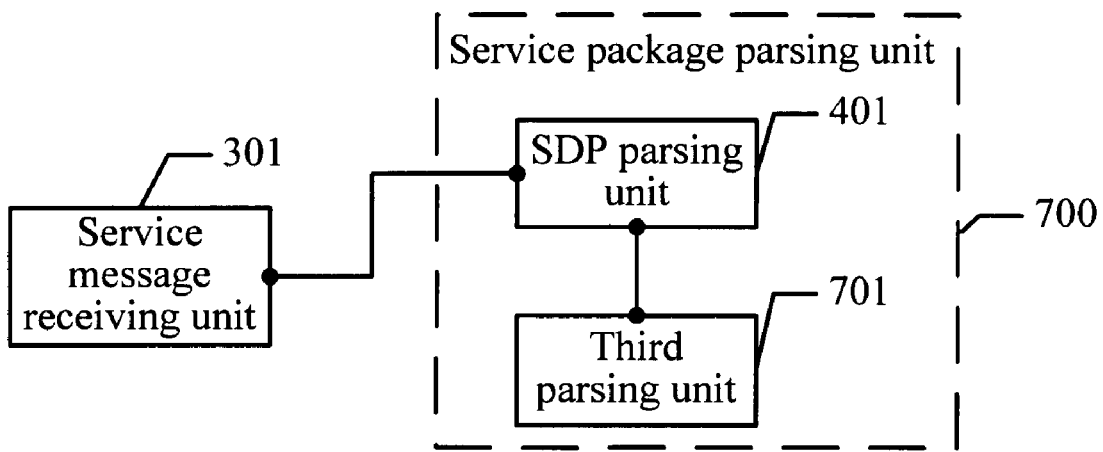
FIG. 7 is a schematic view of a service package information obtaining apparatus according to a fifth embodiment of the present invention.

Referring to FIG. 7, a fifth embodiment of the service package information obtaining apparatus includes a service message receiving unit 301 and a service package parsing unit 700.

The service message receiving unit 301 is configured to receive a service message carrying SDP information, the SDP information contains service package information, and the service package information is the information about the service package required for performing the service corresponding to the service message.

The service package parsing unit 700 is configured to parse an attribute line from the SDP information, and parse the service package information from the attribute line.

The service package parsing unit 700 further includes an SDP parsing unit 401 and a third parsing unit 701.

The SDP parsing unit 401 is configured to parse the received SDP to obtain the attribute line.

The third parsing unit 701 is configured to parse an attribute component of the attribute line to obtain a default service package attribute, and parse an attribute value component of the attribute line to obtain a default service package identifier corresponding to the default service package attribute.

Figure 8:
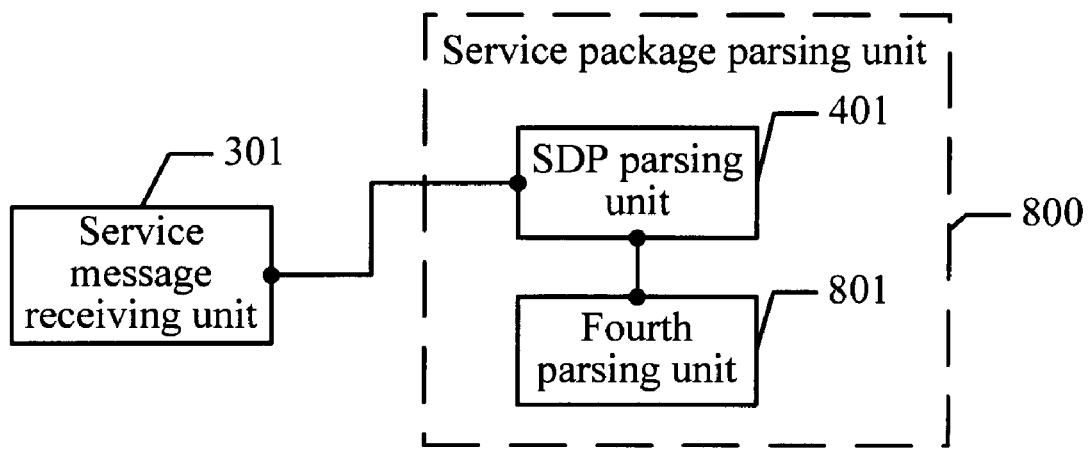
FIG. 8 is a schematic view of a service package information obtaining apparatus according to a sixth embodiment of the present invention.

Referring to FIG. 8, a sixth embodiment of the service package information obtaining apparatus includes a service message receiving unit 301 and a service package parsing unit 800.

The service message receiving unit 301 is configured to receive a service message carrying SDP information, the SDP information contains service package information, and the service package information is the information about the service package required for performing the service corresponding to the service message.

The service package parsing unit 800 is configured to parse an attribute line from the SDP information, and parse the service package information from the attribute line. The service package parsing unit 800 further includes an SDP parsing unit 401 and a fourth parsing unit 801.

The SDP parsing unit 401 is configured to parse the received SDP to obtain the attribute line.

The fourth parsing unit 801 is configured to parse an attribute component of a first attribute line to obtain a service package attribute, parse an attribute value component of the first attribute line to obtain a service package identifier corresponding to the service package attribute, and parse an attribute component of a second attribute line to learn that the service package is a default service package.

Figure 9:
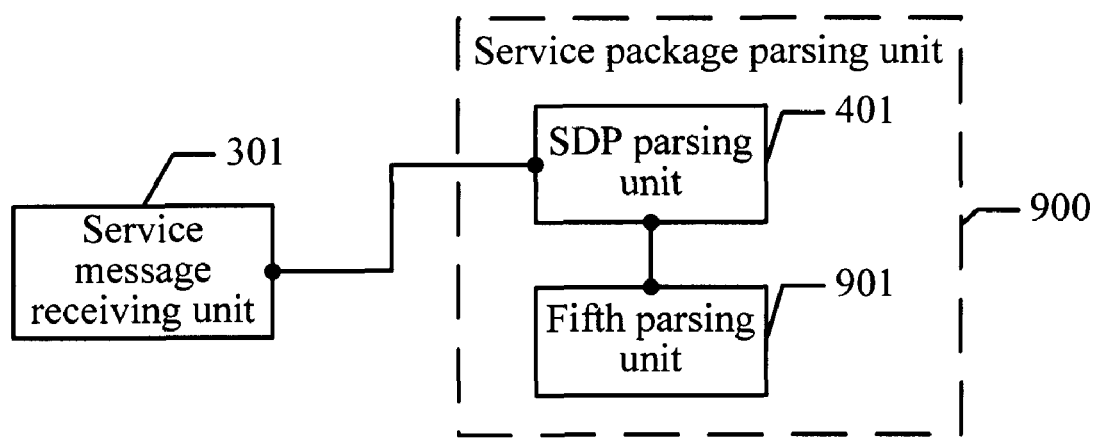
FIG. 9 is a schematic view of a service package information obtaining apparatus according to a seventh embodiment of the present invention.

Referring to FIG. 9, a seventh embodiment of the service package information obtaining apparatus includes a service message receiving unit 301 and a service package parsing unit 900.

The service message receiving unit 301 is configured to receive a service message carrying SDP information, the SDP information contains service package information, and the service package information is the information about the service package required for performing the service corresponding to the service message.

The service package parsing unit 900 is configured to parse an attribute line from the SDP information, and parse the service package information from the attribute line. The service package parsing unit 900 further includes an SDP parsing unit 401 and a fifth parsing unit 901.

The SDP parsing unit 401 is configured to parse the received SDP to obtain the attribute line.

The fifth parsing unit 901 is configured to parse an attribute component of the attribute line to obtain a service package attribute, and parse an attribute value component of the attribute line to obtain a service package identifier and a channel identifier.

Figure 10:
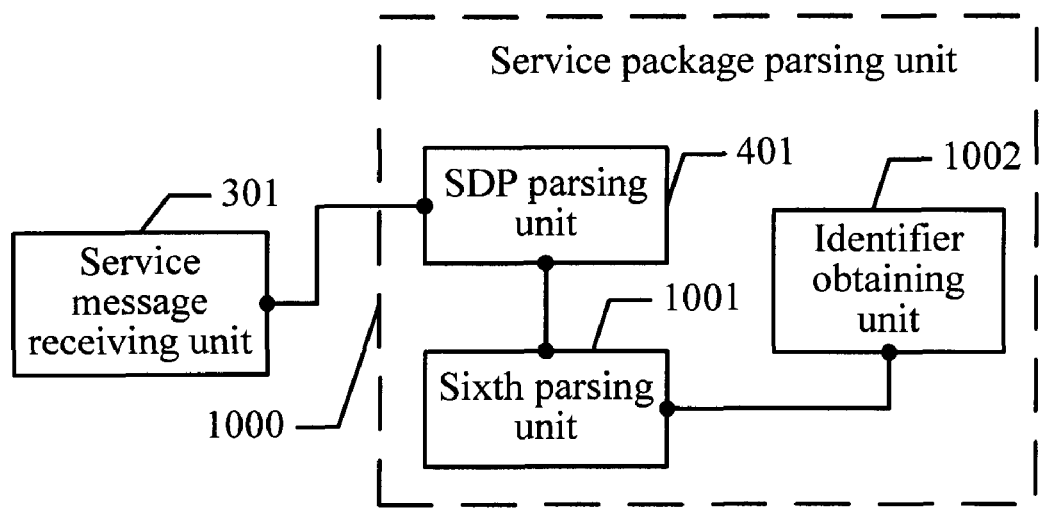
FIG. 10 is a schematic view of a service package information obtaining apparatus according to an eighth embodiment of the present invention.

Referring to FIG. 10, an eighth embodiment of the service package information obtaining apparatus includes a service message receiving unit 301 and a service package parsing unit 1000.

The service message receiving unit 301 is configured to receive a service message carrying SDP information, the SDP information contains service package information, and the service package information is the information about the service package required for performing the service corresponding to the service message.

The service package parsing unit 1000 is configured to parse an attribute line from the SDP information, and parse the service package information from the attribute line. The service package parsing unit 1000 further includes an SDP parsing unit 401, a sixth parsing unit 1001, and an identifier obtaining unit 1002.

The SDP parsing unit 401 is configured to parse the received SDP to obtain the attribute line.

The sixth parsing unit 1001 is configured to parse an attribute component of the attribute line to obtain a default service package attribute.

The identifier obtaining unit 1002 is configured to obtain a default service package identifier from a header field of an SIP or other attribute lines.

Persons of ordinary skill in the art should understand that all or a part of the steps in the method according to the embodiments of the present invention can be implemented by a program instructing relevant hardware, and the program may be stored in a computer readable storage medium. When the program is run, the following steps are performed. A service message carrying SDP information is received, and the SDP information contains service package information. The service package information is parsed from the SDP information. The service package information is employed for resource reservation.

The medium resource reservation method, the service package information obtaining method, and the service package information obtaining apparatus are described in detail above. Persons of ordinary skill in the art can make variations and modifications to the present invention in terms of the specific implementations and application scopes according to the ideas of the present invention. Therefore, the specification shall not be construed as limitations to the present invention.

What is claimed is:

1. A medium resource reservation method, comprising:
  receiving a service message carrying Session Description Protocol (SDP) information, wherein the SDP information contains service package information; and
  obtaining the service package information from the SDP information, wherein the service package information is for resource reservation;
  wherein the service package information is contained in the SDP information by:
  setting a service package attribute in an attribute component of an attribute line of the SDP information, and setting a service package identifier or a channel identifier in an attribute value component of the attribute line of the SDP information.

2. The method according to claim 1, wherein the service package identifier is a number, a uniform resource identifier (URI), a uniform resource locator (URL), a character set, or a token; and
  the channel identifier is a number, a URI, a URL, a character set, or a token.

3. The method according to claim 1, wherein the resource reservation according to the service package information comprises:
  obtaining media components contained in the service package; and
  reserving media resources of the media components.

4. A service package information obtaining apparatus, comprising:
  a service message receiving unit, configured to receive a service message carrying Session Description Protocol (SDP) information, wherein the SDP information contains service package information; and
  a service package information obtaining unit, configured to obtain the service package information from the SDP information, wherein the service package information is for resource reservation;
  wherein a service package attribute is set in an attribute component of an attribute line of the SDP information and a service package identifier or a channel identifier is set in an attribute value component of the attribute line of the SDP information.

* * * * *